US012342256B2

(12) United States Patent
Kolaxis

(10) Patent No.: US 12,342,256 B2
(45) Date of Patent: Jun. 24, 2025

(54) METHOD AND SYSTEM FOR ASYNCHRONOUS REPORTING OF EMERGENCY INCIDENTS

(71) Applicant: ATOS Public Safety, LLC, Irving, TX (US)

(72) Inventor: Ioannis Kolaxis, Athens (GR)

(73) Assignee: ATOS Public Safety, LLC, Irving, TX (US)

( * ) Notice: Subject to any disclaimer, the term of this patent is extended or adjusted under 35 U.S.C. 154(b) by 302 days.

(21) Appl. No.: 17/888,622

(22) Filed: Aug. 16, 2022

(65) Prior Publication Data

US 2023/0078210 A1  Mar. 16, 2023

(30) Foreign Application Priority Data

Sep. 15, 2021 (EP) .................................. 21 196 936

(51) Int. Cl.
*H04W 4/90* (2018.01)
*H04W 4/02* (2018.01)
*H04W 4/12* (2009.01)

(52) U.S. Cl.
CPC ............. *H04W 4/90* (2018.02); *H04W 4/025* (2013.01); *H04W 4/12* (2013.01)

(58) Field of Classification Search
CPC ......... H04W 4/025; H04W 4/12; H04W 4/90; G08B 25/007; G08B 25/008; G08B 25/12; G08B 25/002; G08B 27/001; H04M 3/5231; H04M 3/5116

USPC ....................................................... 455/404.2
See application file for complete search history.

(56) References Cited

U.S. PATENT DOCUMENTS

| 10,313,865 | B1 | 6/2019 | Patton et al. |
| 2013/0325878 | A1* | 12/2013 | de Lichana ............. G06F 16/22 |
| | | | 707/748 |
| 2019/0149661 | A1 | 5/2019 | Klaban |
| 2019/0380020 | A1* | 12/2019 | Pellegrini ............ G08B 25/006 |
| 2020/0102093 | A1* | 4/2020 | Claridge ................... B64F 1/22 |
| 2020/0274962 | A1* | 8/2020 | Martin ..................... H04W 4/02 |
| 2020/0288295 | A1* | 9/2020 | Martin .................. H04M 3/5116 |
| 2022/0345868 | A1* | 10/2022 | Clawson ................ A61B 5/024 |
| 2024/0089716 | A1* | 3/2024 | Suzuki ..................... H04W 4/80 |

OTHER PUBLICATIONS

Extended European Search Report for European Application No. 21196936.5 dated Feb. 16, 2022.

* cited by examiner

*Primary Examiner* — Jean A Gelin
(74) *Attorney, Agent, or Firm* — MEAGHER EMANUEL LAKS GOLDBERG & LIAO, LLO

(57) ABSTRACT

A computer-implemented method and corresponding system that can allow an eyewitness of an emergency incident to instantly report it to the emergency services by sending data such as a photo of the emergency scene, without having to wait for a call-taker or agent to answer a call. This data is processed by an emergency service platform, which automatically dispatches the required resources to the emergency scene, thus managing to significantly reduce the response time of emergency services.

14 Claims, 2 Drawing Sheets

METHOD AND SYSTEM FOR ASYNCHRONOUS REPORTING OF EMERGENCY INCIDENTS

CROSS-REFERENCE TO RELATED APPLICATIONS

The present application claims priority to European Patent Application No. EP 21 196 936.5 filed on Sep. 15, 2021. The entirety of this European Patent application is incorporated by reference herein.

FIELD

The present invention relates to a computer-implemented method and a corresponding system that allows an eyewitness of an emergency incident to instantly report it to the emergency services by sending data such as a photo of the emergency scene without having to wait for a call-taker or agent to answer a call. This data is processed by the emergency service which automatically dispatches the required resources (e.g. police, fire brigade, ambulance) to the emergency scene, thus managing to significantly reduce the response time of emergency services.

BACKGROUND

In case of an emergency incident (e.g. a traffic accident) one or more eyewitness will place a phone call via an Emergency Services IP Network (ESInet) to emergency services (e.g. Public Safety Answering Points (PSAPs)) by, for example, dialing 911 in the USA or 112 in Europe.

Especially for large-scale emergency incidents (e.g. a multiple-vehicle collision on the highway), many people will be concurrently calling emergency services whose call-takers, also called agents in the Public Safety Answering Points (PSAPs), will be struggling to answer all the incoming calls related to this incident as well as other incidents that may be in progress at the same time.

SUMMARY

I have recognized that emergency services are obligated to answer each call. Clearly, it may take a considerable time until a call-taker or agent of a PSAP answers the call, assesses the situation, and decides what kind of resources (e.g. police, fire brigade, ambulance) need to be dispatched to the emergency scene. The call-taker will have to set up one or more separate call with the required parties (e.g. set up a conference call with the fire brigade, and ambulance in the event of a fire) and convey all the details (such as the exact location, and type of the incident). The time required to coordinate and dispatch the needed resources can be critical in some cases, making the difference between life and death; therefore, it would be beneficial to reduce the response time, which is the time from the moment someone calls until the emergency responders arrive on the emergency scene.

Nowadays, new types of media data are being introduced to emergency calls, such as text calls or video calls. Text calls are dispatched through text messages via a mobile phone to the emergency network. These types of calls can be used by people who have problems to speak or who cannot speak at the time of the emergency (e.g. because they are hiding from thieves, bank robbery situation). Video calls can nowadays be sent from almost any smart phone or other device. Video calls also have the advantage that they allow the call-taker to have a better understanding of how the emergency scene looks like.

All established types of emergency calls (audio, video, and text calls) are synchronous, meaning that they require at least one caller and one call-taker to be available at the same time to have a discussion and to exchange information about the ongoing emergency incident.

In the case of large-scale emergency incidents, such as a multiple-vehicle collision, there are, however, many callers "competing" with each other for an available call-taker who will answer their emergency call (by audio, video, or text).

Further, considering that most emergency call centers have a small number of call-takers, for example, in California, USA, the call centers (PSAPs) are commonly staffed with only 3-5 call-takers. Therefore, it can take a long time for callers waiting on the line or in the queue for a call-taker to answer their calls. The more time it takes for call-takers to respond, the more likely it is that emergency services will arrive late on the emergency scene, therefore risking the loss of human lives.

A method and a corresponding system for asynchronous reporting of emergency incidents can be provided for empowering emergency call-takers to effectively handle a high number of concurrent emergency calls, as is the case with large-scale emergency incidents. Embodiments of my method and the system can also help emergency services to significantly reduce their response time, which is the time from the moment someone calls until the emergency responders arrive on the emergency scene.

A computer-implemented method for asynchronous reporting of emergency incidents is provided that can include capturing data related to an emergency incident using at least one electronic device. Then, sending the data to an emergency service platform. Transmitting, by a network, the data from the at least one electronic device of one or more eyewitness to the emergency service platform. Receiving, by one or more computer units (e.g. computer device, server, etc.) of the emergency service platform, automatically the transmitted data. Verifying, by the one or more computer units, the authenticity of the data and/or accompanying metadata by comparing and analyzing the data using at least one of a database, Artificial Intelligence (AI), or Machine Learning (ML). Classifying, by the one or more computer units, the data into different categories of emergencies along with the corresponding probability of the emergency in case the emergency incident has been verified as authentic. Then, dispatching, by the one or more computer units, automatically the emergency resources which are needed according to the analysis and classification to the location of the emergency incident in case the data has been found to be authentic.

In some embodiments, at least one computer unit may leverage Artificial Intelligence/Machine Learning to identify if the data, e.g. a photo which illustrates an emergency incident, classifies the photo into different categories of emergencies along with the corresponding probability, for example: traffic accident with a confidence of 92%, fire with a confidence of 75%.

An Artificial Intelligence/Machine Learning model may additionally identify a degree of severity of the emergency along with the corresponding probability, for example: a minor car accident (having only light material damages, not involving any human injuries) with a confidence of 81%, a major car accident (involving human injuries that may be life-threatening) with a confidence of 91%.

According to another aspect of the invention, based on the analysis of the emergency data in the previous above mentioned method steps, if the data has been found to be authentic and illustrates an emergency incident, then a computer unit may automatically dispatch the needed resources (e.g. police, fire brigade, ambulance) to the location of the emergency. As an example, if data, e.g. a photo, is classified as a minor car accident (having only light material damages, not involving any human injuries) then the vehicle registration plates may be automatically recognized in the photos, hence extracting the related vehicle numbers. Next, a search may be performed in a database for the insurance company that has insured the given vehicle and then send a notification to the insurance company so that it can dispatch a car crash expert and/or a tow truck onsite. The police may not have to be notified in the case of light car crashes so that they can save valuable time dealing with more critical incidents. On the other hand, if data, e.g. a photo, is classified by the Machine Learning algorithm as a major car accident, then the police and the medical support will be automatically notified for a police officer and an ambulance to be dispatched on site. All these actions may be automatically performed by the system and the method without involving any human activity.

According to a preferred embodiment of the method, the data can include metadata with a location information related to the emergency incident and/or wherein the data further comprising a callback number. This is for the case a call-taker or agent handling the emergency incident can talk to the eyewitness to ask further information if this is of importance.

According to another preferred embodiment of the method, the data is related to at least one or more media data type.

According to still another preferred embodiment, the media data type comprising photo data or picture data, video data or text message data. In the classical sense, text messages are not pure media type data, but in the sense of the invention they are subsumed here.

Further, according to a preferred embodiment of the method, the electronic device can be or cn include at least one of a smart phone, a tablet, a smart watch or a mobile computer device and/or the one or more computer unit of the emergency service platform comprising at least one of a server unit, an image processing unit, an Artificial Intelligence unit, a Machine Learning unit, or a workstation. It should be appreciated that these devices are telecommunication devices that can include a processor connected to a non-transitory computer readable medium, at least one transceiver and include or be communicatively connectable to one or more input devices and one or more output devices and/or one or more input/output devices (e.g. a touch screen display).

According to yet another preferred embodiment of the method, the metadata can be embedded in the media data type itself, or the metadata can be provided separately from the media data type and/or wherein the metadata is in the Exchangeable image file format (Exif format). Exchangeable image file format is a standard that specifies the formats for images, sound, and ancillary tags used by digital cameras (including smartphones), scanners and other systems handling image and sound files recorded by digital cameras. The specification uses some of existing file formats with the addition of specific metadata tags. The Exif format has standard tags for location information. Today, many cameras and mobile phones have a built-in GPS receiver that stores the location information in the Exif header when a picture is taken. Some other cameras have a separate GPS receiver that fits into the flash connector or hot shoe. Recorded GPS data can also be added to any digital photograph on a computer, either by correlating the time stamps of the photographs with a GPS record from a hand-held GPS receiver or manually by using a map or mapping software. Some cameras can be paired with cellphones to provide the geolocation. The process of adding geographic information to a photograph is known as geotagging.

According to yet another preferred embodiment of the method, wherein upon receiving the data, the method further comprises, processing, by the one or more computer unit, automatically the transmitted data and accompanying metadata, if present, so that they meet the minimum and/or maximum requirements for further processing and evaluation of the data by the emergency service platform. Minimum and/or maximum requirements in the sense of the invention are for example resolution, color depth, size, brightness, contrast and the like. Furthermore, processing means that, for example, in relation to the emergency incident, relevant sections of an image, photo or video are specially processed, e.g. with various filters that give more contrast and sharpness to the image in order to recognize certain objects, buildings, streets, etc.

According to yet another preferred embodiment of the method, wherein the step of verification and analyzation of the data the method further comprising at least one of using the metadata location information and comparing and analyzing the location information with pre-validated location data in a database; or if no location information is available, comparing the data against a database of known images, photos, videos from the area of responsibility of the emergency service platform, or comparing and analyzing, by the emergency service platform, the data with the help of Artificial Intelligence and/or Machine Learning Tools on the basis of weather conditions, radio/television news or social media data retrieved from the side of the emergency incident; or if no location information is available, comparing and analyzing, by the emergency service platform, the data with the help of Artificial Intelligence and/or Machine Learning Tools on the basis of an internet database or an image or video database.

Given the location of the received emergency data like, for example, a photo, the unit will automatically compare this data against a database of pre-validated data from the same location, to verify if the surroundings (e.g. buildings in the background) of the received data match the ones in the pre-validated data of the given location. For example, if the received data is a photo supposed to be taken in the city center of Athens where there are a lot of tall buildings, but the background of the image illustrates a rural area, then it is likely that this photo is not authentic. To check the similarity of a given image against a database of images coming from the same location, well-known techniques will be used to calculate the correlation between two data sets for example two images.

Alternatively, if the location is not available (for instance, Exif metadata could not be extracted from a received emergency data), then this data can be compared against a database of, for example, known photos or videos from the area of responsibility (e.g. same city, district, etc.) of the emergency service platform. Based on the similarity of the received data with data from this database, the emergency platform could indirectly identify where this data, e.g. an image, may have been taken. On the other hand, if the background of the received photo does not correlate to any of the data, e.g. images in the database, then it is likely that this data is not genuine.

Optionally, a computer unit could leverage Artificial Intelligence to identify the weather conditions depicted in the received emergency data (photo, video). For example, if it is known in a location that it is currently raining, but the received data illustrates or shows a sunny weather for the same location, then it is likely that the received data is not authentic. This will be an automated process, where the current weather conditions of a location will be retrieved in real-time and consequently compared against the weather conditions displayed in the received data.

Optionally, a computer unit could search the internet or other image or video databases for identical or similar data to the one received. If there is an exact match or a high similarity (e.g. above 95%) with a data found on the internet or an external database, then it is likely that the received data is not authentic, but it was downloaded/copied and sent to the emergency services platform as a prank.

According to yet another preferred embodiment of the method, wherein upon dispatching the emergency resources the method can also include sending/notifying, by the emergency service platform, the data of the one or more eyewitness which have been verified and classified to be related with the emergency incident, to the one or more call-taker or agent. In this case, one or more call-taker will be notified of the received emergency data, for example, if these have been found to be authentic, classified by the Artificial Intelligence/Machine Learning model as emergencies with a probability exceeding a predefined threshold, e.g. 50%.

According to yet another preferred embodiment, wherein upon receiving the data, matching and marking the exact location of the incident automatically on a digital map of an intelligent workstation of the call-taker or agent. For each emergency data received, a marker may be displayed on the map of the call-taker's intelligent workstation, indicating the exact location of the emergency scene. An appropriate icon may be used for the map marker to indicate the category of the emergency, for example, an icon of a crashed car may indicate a traffic accident, an icon of fire flames may indicate a building on fire, etc.

For each emergency incident reported via data like photos, videos or else, a call-taker can optionally view the emergency data received via an intelligent workstation, for example, by clicking on a map marker or by clicking on an entry in a list displaying all the data received.

These received data may complement emergency calls, since they can provide additional information to call-takers who are already busy handling audio calls. For example, while a call-taker is on the phone handling an emergency about a car accident, a new dataset is sent about the same incident. A new map marker would be displayed on the map indicating a car accident, with this map marker being right next to the one of the audio call. The call-taker should be able to check this data while they are handling the audio call, as the data would support their work helping them make better decisions based on this information.

According to yet another preferred embodiment of the method, wherein upon receiving the data, the method further comprises, providing, by the call-taker or agent manually feedback about the received data in case the data has been misclassified or applying, by the call-taker or agent, corrective actions in case the automatically dispatched emergency resources have to be recalled, changed or extended.

In case a media data, for example, a photo that illustrates crashed cars, has been misclassified by, e.g. a Machine Learning model used, as a "non-emergency", the call-taker may provide corrective input by labeling this data as an emergency, specifying its type, for example, being a traffic accident. This corrective action may trigger the dispatching of the required resources. Additionally, the call-taker's corrective input will be stored along with the received data, so that the Machine Learning model used can be retrained later to have its accuracy improved. The call-taker may be prompted to provide input specifically for photos that have been classified by the Machine Learning model used with a confidence less than a predefined threshold (e.g. less than 80%).

If emergency resources (e.g. police, fire brigade, ambulance or medical or technical support) have been automatically dispatched upon receiving an emergency data, the call-taker can apply corrective actions, either recalling some of the already dispatched resources or dispatching additional resources. The call-taker's input will be saved together with the received data, so that the Machine Learning model used can be retrained later to improve its "ability" to dispatch the right resources.

According to yet another preferred embodiment of the method, wherein the data is sent as Email, SMS (Short Message Service), MMS (Multimedia Messaging Service), or as a message via a Mobile Application.

According to the invention, a system for asynchronous reporting of emergency incidents is also provided. Embodiments of the system can be configured to implement an embodiment of the above discussed method.

According to a preferred embodiment, the system can include at least one of an electronic device of an eyewitness configured to capture and transmit data of an emergency incident, an emergency service platform configured to receive the data and handle the incident, a network configured to transmit the data from the at least one electronic device to the emergency service platform, one or more computer unit configured to automatically receive, process, analyze, compare and verify the data and further configured to automatically dispatch emergency resources, or an internal database and/or external database. It should be appreciated that a database can be stored in non-transitory memory and be communicatively connectable to the computer unit of an emergency service platform via an intranetwork communicative connection or an internetwork communicative connection, for example.

According to another preferred embodiment of the system, the one or more computer units can include at least one of a server unit configured to provide the relevant applications, CPU (Central Processing Unit) resources and infrastructure to manage the method, an image processing unit configured to process the media data according to pre-established requirement, an artificial intelligence unit and/or a Machine Learning unit configured to compare, analyze, classify, and verify the data, or a workstation for the call-takers or agent of the emergency service platform configured to supervise and/or monitor the processes of the method. Each server unit can be a computer device having a processor connected to a non-transitory memory and at least one transceiver to host at least one service and have such elements, for example.

As described, all existing methods dealing with audio, video, text calls for reporting an incident to the emergency services are synchronous, requiring a call-taker assigned to each incoming call. Clearly, these synchronous calls do not scale well, especially in the case of large-scale emergencies (e.g. a multiple-vehicle collision on the highway) where the number of incoming calls, e.g. >100 calls are way more than the number of call-takers (e.g. 3-5 call-takers) working in the call center or PSAP.

Embodiments of my system and method can provide for an asynchronous process of reporting emergency incidents via data, especially media data like photos or videos. The eyewitness of an accident or any other emergency situation does not have to wait for a call-taker to answer an audio call, but instead sends data such as a photo or video to the emergency service platform where it is instantly processed by a computer unit which can, after a verifying step, automatically dispatch the required emergency resources (e.g. police, etc.) to the emergency scene. The call-takers supervise and/or monitor the automatic actions that were taken by the devised computer method, and apply manual, corrective actions only when this is needed.

One value proposition of this computer-implemented method is that it can help emergency services to significantly reduce their response time, which is the time from the moment someone calls until the emergency responders arrive on the emergency scene.

According to yet another aspect of the present invention, a program element is storeable on non-transitory memory or other type of non-transitory computer readable medium that can define an embodiment of an above noted method so that, when being executed by a processor steps of the method for asynchronous reporting of emergency incidents are performed by the device running the program element (e.g. code, application, etc.).

According to another aspect of the present invention, a non-transitory computer-readable medium comprising program code is provided which when being executed by a processor is adapted to carry out steps of the method for asynchronous reporting of emergency incidents.

A computer-readable medium may be a floppy disk, a hard disk, an USB (Universal Serial Bus) storage device, a RAM (Random Access Memory), a ROM (read only memory) or an EPROM (Erasable Programmable Read Only Memory). A computer readable medium may also be a data communication network, e.g. the Internet, which may allow downloading a program code.

It has also to be noted that aspects of the invention have been described with reference to different subject-matters. In particular, some aspects or embodiments have been described with reference to apparatus type claims whereas other aspects have been described with reference to method type claims. However, a person skilled in the art will gather from the above and the following description that, unless otherwise notified, in addition to any combination between features belonging to one type of the subject-matter, also any combination between features relating to different types of subject-matters is considered to be disclosed with this text. In particular, combinations between features relating to the apparatus type claims and features relating to the method type claims are considered to be disclosed.

Other details, objects, and advantages of the telecommunications apparatus, system, device, non-transitory computer readable medium, and method will become apparent as the following description of certain exemplary embodiments thereof proceeds.

BRIEF DESCRIPTION OF THE DRAWINGS

The invention and embodiments thereof will be described below in further detail in connection with the drawings. It should be appreciated that like reference numbers can identify similar components.

Figure 1:
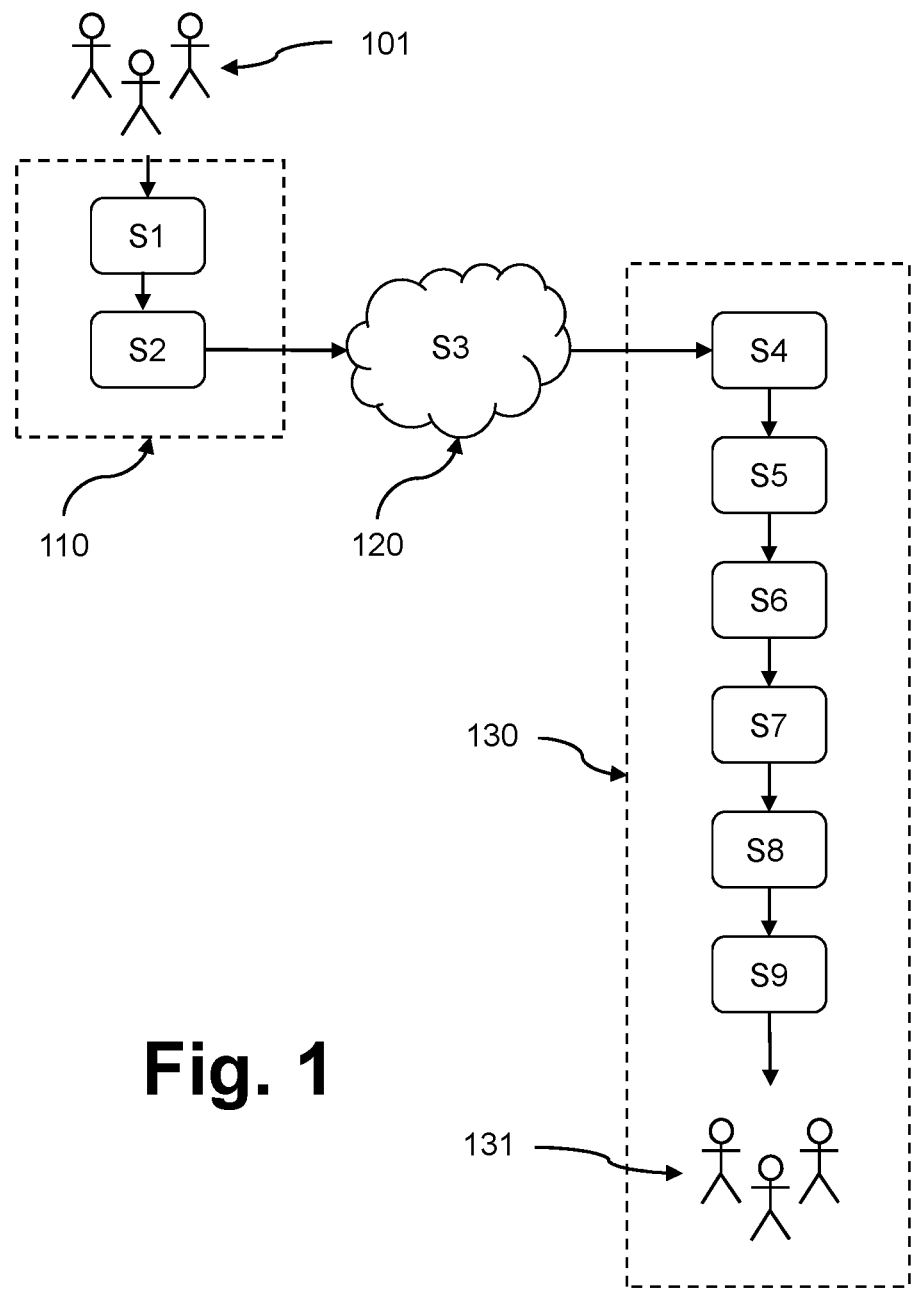
FIG. 1 shows a flowchart of the method according to an embodiment of the invention.

REFERENCE NUMERAL USED IN THE DRAWINGS INCLUDE 101 eyewitness(es)
110, 210 electronic device
120, 220 network
130, 230 emergency service platform
131, 231 call-taker(s) or agent(s)
200 system
232 internal database
240 computer unit
241 server unit
242 image processing unit
243 Artificial Intelligence unit
244 Machine Learning unit
245 workstation
250 external database
260 emergency resources
S1-S9 Steps 1 to 9 of the method

DETAILED DESCRIPTION

FIG. 1 schematically shows a flowchart of the method according to an embodiment of the invention. For simplicity in the description of this method depicted in FIG. 1, it is assumed that as data, photos are taken by one or more eyewitnesses 101 of an emergency incident, for example a multi-vehicle accident. Thereby, the eyewitnesses 101 using an electronic device 110, such as a smart phone, a tablet, or a similar device to take one or more photos of the emergency incident (step S1).

Then, the one or more photo of the emergency incident is sent together with metadata via email, or via MMS (Multimedia Messaging Service), or via a Mobile Application or using any other electronic means (step S2). The photo and corresponding metadata are sent to an emergency services platform 130.

Thereby, the data sent may include location information of the emergency scene, which may be embedded in the photo itself (e.g. using the Exif format) or provided separately from the photo. Further, a callback number of the eyewitness may also be sent. This is of advantage if a call-taker or agent 131 later wishes to talk to the eyewitness 101 to ask further information.

However, the photo along with the metadata will be transmitted over a network 120 (step S3). This may be a network (e.g. Emergency Services IP Network, ESInet) of a Telecommunication Services Provider, or an open Wi-Fi network provided by a certain city or else.

The photo together with the metadata will be delivered by the network 120 to an emergency services platform 130, where it may be automatically received by a computer unit, without requiring any human intervention (step S4). The emergency services platform 130 may comprise several other components like an Emergency Service Routing Proxy (ESRP), different Public Safety Answering Points (PSAPs) with corresponding call-takers or agents 131. Furthermore, the emergency service platform 130 may include various computer units. When a computer unit is referred to in the following, it can be always the same computer unit, but it is also possible that a different computer unit can perform the respective task or method step.

The photo may be optionally processed by a computer unit, for example, comprising further an image processing unit which resizes the photo so that it meets the minimum/maximum size and resolution requirements, and extract the location data from the photo (step S5). Similarly, the accompanying metadata may also be processed by such a computer unit.

The authenticity of the photo and its accompanying metadata may be verified by also a computer unit (step S6). Thereby, several tests may be performed. Given the location of the received emergency photo, it will automatically compare this photo against a database of pre-validated photos from the same location, to verify if the surroundings (e.g. buildings in the background) of the received photo match the ones in the pre-validated photos of the given location. For example, if the received photo is supposed to be taken in the city center exhibiting a lot of tall buildings, but the background of the image illustrates a rural area, then it is likely that this photo is not authentic. To check the similarity of a given image against a database of images coming from the same location, well-known techniques will be used to calculate the correlation between two images. Alternatively, if the location is not available for instance, Exchangeable image file format (Exif-) metadata could not be extracted from a received emergency photo, then this image can be compared against a database of known photos from the area of responsibility (e.g. same city, district, etc.) of the emergency service platform 130 or one of the call centers (PSAPs) of it. Based on the similarity of the received photo with images from this database, it could indirectly identify the location where this image may have been taken. On the other hand, if the background of the received photo does not correlate to any of the images in the database, then it is likely that this photo is not genuine. As another option, a computer unit could leverage Artificial Intelligence to identify the weather conditions depicted in the received emergency photo and compare these data with weather data. However, as yet another option, a computer unit could search the internet or other image databases for identical or similar photos to the one received. If there is an exact match or a high similarity (e.g. above 95%) with a photo found on the internet or an image database, then it is likely that the received photo is not authentic, but it was downloaded/copied and sent to the emergency service(s) as a prank.

Then, a computer unit may leverage Artificial Intelligence/Machine Learning to identify if the photo illustrates an emergency incident, classifying the photo into different categories of emergencies along with the corresponding probability (step S7). For example, a traffic accident might occur with a confidence of 92%, a fire with a confidence of 75%. An Artificial Intelligence/Machine Learning model may additionally identify the degree of severity of the emergency along with the corresponding probability, for example: a minor car accident (having only light material damages, not involving any human injuries) with a confidence of 81%, a major car accident (involving human injuries that may be life-threatening) with a confidence of 91%.

Based on the analysis of the emergency photo in the previous steps, if the photo has been found to be authentic and illustrates an emergency incident, then a computer unit may automatically dispatch the needed resources (e.g. police, fire brigade, ambulance) to the location of the emergency (step S8). As an example, if a photo is classified as a minor car accident (having only light material damages, not involving any human injuries), then the vehicle registration plates may be automatically recognized in the photos, hence extracting the related vehicle numbers. Next, a search may be performed in a database for the insurance company that has insured the given vehicle and then send a notification to the insurance company, so that it can dispatch a car crash expert and/or a tow truck onsite. The police may not have to be notified in the case of light car crashes, so that they can save valuable time dealing with more critical incidents. On the other hand, if a photo is classified by the machine learning algorithm as a major car accident, then the police and the medical support will be automatically notified for a police officer and an ambulance to be dispatched on site. All these actions may be automatically performed by the system, without involving any human activity.

After this step, one or more call-takers 131 may be notified of the received emergency photo (step S9), if these have been found to be authentic, classified by the Artificial Intelligence/Machine Learning model as emergencies with a probability exceeding a pre-defined threshold (e.g. 50%).

For each emergency photo received, a marker may be displayed on the map of the call-taker's intelligent workstation, indicating the exact location of the emergency scene. An appropriate icon may be used for the map marker to indicate the category of emergency, for example an icon of a crashed car may indicate a traffic accident, an icon of fire flames may indicate a building on fire, etc.

For each emergency incident reported via photos, a call-taker 131 can optionally view the emergency photos received via an intelligent workstation, for example by clicking on a map marker or by clicking on an entry in a list displaying all the photos received.

Photos may complement emergency calls, since they can provide additional information to call-takers who are already busy handling audio calls. For example, while a call-taker is on the phone handling an emergency about a car accident, a new photo is sent about the same incident. A new map marker would be displayed on the map indicating a car accident, with this map marker being right next to the one of the audio call. The call-taker should be able to check this photo, while they are handling the audio call, as the photo would support their work helping them make better decisions based on this information.

A call-taker 131 may also manually provide feedback about a received emergency photo. In case a photo has been misclassified by the Machine Learning model as a "non-emergency", the call-taker may provide corrective input by labeling this photo as an emergency, specifying its type, for example being a traffic accident. This corrective action may trigger the dispatching of the required resources. Additionally, the call-taker's corrective input will be stored along with the received photo, so that the Machine Learning model can be retrained later to have its accuracy improved. The call-taker may be prompted to provide input specifically for photos that have been classified by the Machine Learning model with a confidence less than a predefined threshold (e.g. less than 80%).

Furthermore, if emergency resources such as police, etc., have been automatically dispatched upon receiving an emergency photo, the call-taker 131 can apply corrective actions, either re-calling some of the already dispatched resources or dispatching additional resources. The call-taker's input will be saved together with the received photo, so that the Machine Learning model can be retrained later to improve its "ability" to dispatch the right resources.

Figure 2:
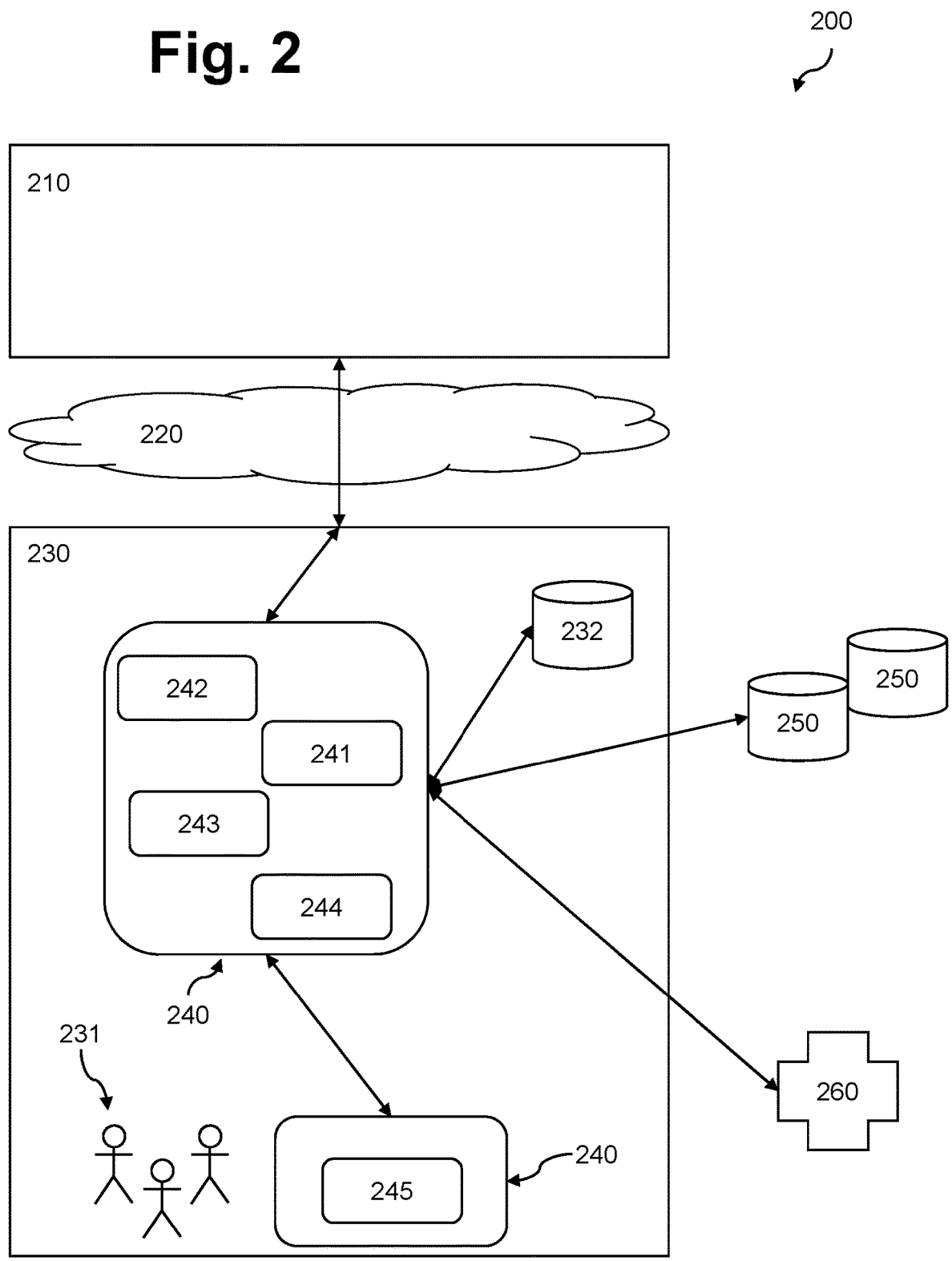
FIG. 2 shows a schematic illustration of an exemplary embodiment of my system according to another embodiment of the invention.

FIG. 2 shows a schematic illustration of the system 200 according to another embodiment of the invention. In this regard, the system 200 comprises at least one electronic device 210 with which an eyewitness to an incident can send data and, if necessary, communicate with an emergency service platform 230 via a network 220. The electronic device 210 may be, for example, a smartphone or tablet, or something else such as a smartwatch.

Assuming an eyewitness to an accident takes a photo of the emergency scene and sends it over the network 220 to the emergency service platform 230, where the photo of the accident is received by a computer unit 240. From the same computer unit 240 or another computer unit 240, for example, an image processing unit 242 or a server unit 241 which may be part of a computer unit 240 or which are part of the emergency service platform 230, the photo is then pre-processed.

Subsequently, by means of another or a previously mentioned computer unit 240, the image is evaluated and checked for authenticity. For this purpose, further units such as an artificial intelligence unit 243 and/or a machine learning unit 244 may be involved. These units 243, 244 may be part of another computer unit 240 or may exist independently in the emergency service platform 230. It is also possible that these units 243, 244 are located externally and, if necessary, are accessed by the emergency service platform 230 for the purpose of evaluation.

When evaluating the photo, the emergency service platform 230 uses internal and/or external databases 232, 250 or other external services. If the analysis shows, for example, that the photo shows a real emergency situation, the emergency service platform 230 or one of its sub-units 240 such as a server unit 241, can automatically notify the emergency resources 260 such as the police or the fire department determined for this emergency on the basis of the analysis without a human or call-taker or agent 231 having to take over. Further, call-takers or agents 231 may also be notified of the relevant photo(s) by means of a suitable intelligent workstation 245, which in turn may be part of another computing unit 240 or may be self-contained in the platform 230. The location data from the photos can then be displayed on a map via the workstation 245 to the call-takers or agents 231. These call-takers or agents 231 then have the opportunity to make any changes regarding this emergency situation.

It should be appreciated that different embodiments of the method, communication system, and communication apparatus can be developed to meet different sets of design criteria. For example, the particular type of network connection, server configuration or client configuration for a device for use in embodiments of the method can be adapted to account for different sets of design criteria. As yet another example, it is contemplated that a particular feature described, either individually or as part of an embodiment, can be combined with other individually described features, or parts of other embodiments. The elements and acts of the various embodiments described herein can therefore be combined to provide further embodiments. Thus, while certain exemplary embodiments of a telecommunication apparatus, telecommunication device, terminal device, a network, a server, a communication system, and methods of making and using the same have been shown and described above, it is to be distinctly understood that the invention is not limited thereto but may be otherwise variously embodied and practiced within the scope of the following claims.

What is claimed is:

1. A computer-implemented method for asynchronous reporting of emergency incidents, comprising:

capturing data related to an emergency incident using an electronic device;

sending the data to an emergency service platform;

receiving the data by at least one computer unit of the emergency service platform;

verifying, by the at least one computer unit, an authenticity of the data and/or accompanying metadata by comparing and analyzing the data using at least one of a database, Artificial Intelligence, or Machine Learning;

classifying, by the at least one computer unit, the data into different categories of emergencies along with the corresponding probability of the emergency in case the emergency incident has been verified as authentic;

automatically dispatching, by the at least one computer unit, the emergency resources which are needed according to the analysis and classification to the location of the emergency incident in case the data has been found to be authentic;

receiving corrective feedback from one or more call-takers or agent comprising corrective classification of the received data in case data has been misclassified and one or more corrective actions in case the automatically dispatched emergency resources have to be re-called, changed or extended; and storing the received corrective feedback with the received data so that an artificial intelligence unit and/or a Machine Learning unit of the at least one computer unit used for classifying the received data and/or automatically dispatching the emergency resources can be retrained later to have its accuracy improved.

2. The method of claim 1, wherein the data further comprising metadata with a location information related to the emergency incident and/or wherein the data further comprising a callback number.

3. The method of claim 1, wherein the data is related to at least one or more media data type.

4. The method of claim 3, wherein the media data type comprising photo data or picture data, video data or text message data.

5. The method of claim 1, wherein the at least one electronic device comprises at least one of a smart phone, a tablet, a smart watch or a mobile computer device; and/or
the at least one computer unit of the emergency service platform comprises at least one of a server unit, an image processing unit, an Artificial Intelligence unit, a Machine Learning unit, or a workstation.

6. The method of claim 1, wherein the metadata is embedded in the media data type itself or the metadata is provided separately from the media data type, and/or wherein the metadata is in the Exchangeable image file, Exif, format.

7. The method of claim 1, also comprising:

automatically processing, by the one or more computer unit, the sent data and accompanying metadata, if present, so that they meet the minimum and/or maximum requirements for further processing and evaluation of the data by the emergency service platform.

8. The method of claim 1, wherein the verifying comprises:

at least one of using the metadata location information and comparing and analyzing the location information with pre-validated location data in a database; or if no location information is available, comparing the data against a database of known images, photos, videos from the area of responsibility of the emergency service platform; or comparing and analyzing, by the emergency service platform the data with the help of Artificial Intelligence and/or Machine Learning Tools on the basis of weather conditions, radio/television news or social media data retrieved from the side of the emergency incident; or if no location information is available, comparing and analyzing, by the emergency service platform, the data with the help of Artificial Intelligence and/or Machine Learning Tools on the basis of an internet database or an image or video database.

9. The method of claim 1, comprising:

notifying, by the emergency service platform, one or more call-taker or agents of the data which has been verified and classified to be related with the emergency incident.

10. The method of claim 1, comprising:

matching and marking an exact location of the incident on a digital map of an intelligent workstation of the call-taker or agent.

11. The method of claim 1, wherein the data is sent as Email, SMS, Short Message Service, MMS, Multimedia Messaging Service, or as a message via a Mobile Application.

12. A system for asynchronous reporting of emergency incidents, comprising:

at least one computer unit of an emergency service platform communicatively connectable to at least one electronic device of at least one eyewitness to receive data related to an emergency incident captured by the at least one electronic device, the at least one computer unit configured to verify an authenticity of the data and/or accompanying metadata by comparing and analyzing the data using at least one of a database, Artificial Intelligence, or Machine Learning;

the at least one computer unit configured to classify the data into different categories of emergencies along with the corresponding probability of the emergency in case the emergency incident has been verified as authentic;

the at least one computer unit configured to automatically dispatch the emergency resources which are needed according to the analysis and classification to the location of the emergency incident in case the data has been found to be authentic;

the at least one computer unit configured to receive corrective feedback from one or more call-takers or agent comprising corrective classification of the received data in case data has been misclassified and one or more corrective actions in case the automatically dispatched emergency resources have to be re-called, changed, or extended; and the at least one computer unit configured to store the received corrective feedback with the received data so that an artificial intelligence unit and/or a Machine Learning unit of the at least one computer unit used for classifying the received data and/or for automatically dispatching the emergency resources can be retrained later to have its accuracy improved.

13. The system of claim 12, also comprising at least one of:

the at least one electronic device;

a network configured to transmit the data from the at least one electronic device to the emergency service platform;

an internal database; and/or an external database.

14. The system of claim 12, wherein:

the at least one computer unit includes at least one of: a server unit, an image processing unit configured to process the media data according to pre-established requirement, an artificial intelligence unit and/or a Machine Learning unit configured to compare, analyze, classify, and verify the data, and/or a workstation for one or more call-takers or agents of the emergency service platform.

\* \* \* \* \*